(12) United States Patent
Heckel et al.

(10) Patent No.: US 11,504,776 B2
(45) Date of Patent: Nov. 22, 2022

(54) CUTTING TOOL

(71) Applicant: Guehring KG, Albstadt (DE)

(72) Inventors: Gerd Heckel, Puschendorf (DE);
Hans-Peter Hollfelder, Fuerth (DE);
Juergen Thanner, Hilpoltstein (DE)

(73) Assignee: Guehring KG, Albstadt (DE)

( * ) Notice: Subject to any disclaimer, the term of this patent is extended or adjusted under 35 U.S.C. 154(b) by 413 days.

(21) Appl. No.: 16/751,805

(22) Filed: Jan. 24, 2020

(65) Prior Publication Data
US 2020/0261983 A1 Aug. 20, 2020

Related U.S. Application Data

(63) Continuation of application No. PCT/EP2018/070403, filed on Jul. 27, 2018.

(30) Foreign Application Priority Data

Jul. 28, 2017 (DE) ...................... 10 2017 213 048.2

(51) Int. Cl.
*B23B 27/16* (2006.01)
(52) U.S. Cl.
CPC ................ *B23B 27/1603* (2013.01)
(58) Field of Classification Search
CPC ............ B23B 27/1655; B23B 27/1681; B23B 27/1685; B23B 29/03403; B23B 29/0341; B23B 29/03417; B23B 29/03421; B23B 29/03425; B23B 29/03489; B23B 29/03492

See application file for complete search history.

(56) References Cited

U.S. PATENT DOCUMENTS

| | | |
|---|---|---|
| 955,180 A | 4/1910 | Mason |
| 2,274,244 A | 2/1942 | Miller |
| 3,144,792 A | 8/1964 | Marchis |
| 3,682,561 A | 8/1972 | Lemery et al. |
| 3,918,826 A | 11/1975 | Friedline |
| 4,055,393 A | 10/1977 | Schäfer et al. |
| 4,268,686 A | 5/1981 | Schäfer et al. |
| 4,389,214 A | 6/1983 | Schäfer et al. |

(Continued)

FOREIGN PATENT DOCUMENTS

| | | |
|---|---|---|
| CH | 429 375 A | 1/1967 |
| DE | 40 22 579 A1 | 1/1991 |

(Continued)

OTHER PUBLICATIONS

International Search Report and Written Opinion of the International Searching Authority (and English translation) from a corresponding International patent application (PCT/EP2018/070403) dated Nov. 19, 2018, 28 pages.

(Continued)

*Primary Examiner* — Alan Snyder
(74) *Attorney, Agent, or Firm* — Burr & Brown, PLLC

(57) ABSTRACT

The invention relates to a cutting tool comprising a main part which extends along a longitudinal center axis or rotational axis, at least one cutting insert holder mounted on the main part such that it can be radially adjusted, and an adjusting device for adjusting the position of the cutting insert holder relative to the main part. The adjusting device comprises a threaded sleeve which is non-rotatably but axially movably mounted in the main part and a screw drive driving the threaded sleeve.

20 Claims, 5 Drawing Sheets

(56) References Cited

U.S. PATENT DOCUMENTS

| | | |
|---|---|---|
| 4,416,569 A | 11/1983 | Yamakage et al. |
| 4,430,261 A | 2/1984 | Schäfer et al. |
| 2004/0184893 A1 | 9/2004 | Johne |
| 2007/0084320 A1 | 4/2007 | Frank et al. |
| 2016/0114402 A1 | 4/2016 | Chen |

FOREIGN PATENT DOCUMENTS

| | | |
|---|---|---|
| DE | 196 13 897 A1 | 5/1997 |
| DE | 10 2005 028 366 A1 | 12/2006 |
| EP | 1 767 295 A2 | 3/2007 |
| GB | 1 071 055 A | 6/1967 |
| JP | 2006-321040 A | 11/2006 |
| JP | 2011-194482 | 10/2011 |
| RU | 2 236 328 C1 | 9/2004 |
| WO | 90/05037 | 5/1990 |
| WO | 90/14187 | 11/1990 |
| WO | 03013769 A2 | 2/2003 |

OTHER PUBLICATIONS

DPMAregister from a corresponding German patent application (DE 10/2017 213 048.2) printed on Feb. 12, 2020, 2 pages.
International Preliminary Report on Patentability from a corresponding International patent application (PCT/EP2018/070403) dated Jan. 28, 2020, 9 pages.

CUTTING TOOL

The invention relates to a cutting tool comprising a main body which extends along a longitudinal central axis or axis of rotation, at least one cutting insert carrier arranged radially adjustably on the main body and an adjusting device for adjusting the position of a cutting insert carrier with respect to the main body.

Such a cutting tool is known, for example, from DE 4022579 A1. A cutting tool specified in DE 4022579 A1 has a main body which can be driven rotatably about an axis of rotation and a cutting insert carrier, which carries a cutting tool, arranged radially adjustably on the main body. The cutting insert carrier is designed as a two-armed pivot beam which is arranged pivotably in a pivot bearing aligned transversely to the axis of rotation in the main body with radial adjustment of the cutting tool, in particular a replaceable cutting insert, arranged on the one lever arm of the pivot beam. The adjustment of the cutting insert carrier is accomplished by means of an adjusting device which comprises an adjusting rod (designated as control rod in DE 4022579 A1) arranged axially displaceably in the main body which has two control surfaces inclined with respect to the rod axis in mutually opposite directions at an axial spacing with respect to one another, on which control surfaces respectively one of the lever arms abuts via a pressure pin which is displaceably substantially in the feed direction of the cutting insert carrier in the main body. By means of a displacement of the adjusting rod brought about on the machine tool side, the adjusting device enables an adjustment of the cutting insert carrier between a retracted position in which the cutting tool held on the cutting insert carrier lies at a minimal diameter and an extended position in which the cutting tool held on the cutting insert carrier lies at a maximum diameter. In the lever arm of the cutting insert carrier opposite the cutting tool, an adjusting screw (designated in DE 4022579 A1 as adjusting bolt) which is adjustable against the end face of the associated pressure pin is arranged in a threaded bore which passes through the cutting insert carrier. The adjusting screw enables an adjustment of the cutting insert carrier relative to the longitudinal central axis or axis of rotation of the main body or the adjusting rod in the main body. The adjusting screw with the threaded bore forms an adjusting device integrated in the cutting insert carrier for an individual position adjustment of the cutting insert carrier relative to the longitudinal central axis or axis of rotation of the main body. Beyond this position adjustment which usually takes place within a very narrowly delimited adjusting range, however, the position of the cutting insert carrier cannot be adjusted further.

In order to achieve a high feed accuracy, it is proposed in DE 4022579 A1 to make the cutting insert carrier centrifugal-force neutral and free from play. For this purpose, an embodiment is proposed in which a compression spring package is arranged between the adjusting screw on the one hand and the pressure pin on the other hand. The spring package should ensure that despite the manufacturing inaccuracies, absence of play is always ensured in the region of the adjusting mechanism. The spring package exerts a compressive force on the adjusting screw by means of which the front thread flanks of the adjusting screw as seen in the direction of the compressive force are pressed against the opposite thread flanks of the threaded bore. In this respect, a thread play between the front thread flanks of the adjusting screw and the opposite thread flanks of the threaded bore is reduced. However, a thread play between the rear thread flanks of the adjusting screw and the opposite thread flanks of the threaded bore still persists or is even enlarged. During a machining of a workpiece, however the cutting insert carrier unavoidably experiences reactive forces which are variable in magnitude and/or direction via the cutting tool, which as a result of the thread play present as previously between the rear thread flanks of the adjusting screw and the opposite thread flanks of the threaded bore can result in a radial movement or vibration of the cutting insert carrier. However, a movement or vibration of the cutting insert carrier endangers the desired high feed accuracy or diameter dimensional accuracy of the cutting tool.

Starting from DE 4022579 A1 it is now the object of the invention to provide a cutting tool with a central adjusting device by means of which a precise position adjustment of a cutting insert carrier can be carried out in a reliable and simple manner to achieve a high diameter dimensional accuracy of a tool cutting insert.

This object is achieved by a cutting tool having the features of Claim 1. Advantageous or preferred further developments are the subject matter of the dependent claims.

A cutting tool according to the invention which can be operated in a standing or rotating manner has, similarly to the cutting tool known from DE 4022579 A1, a main body which extends along a longitudinal central axis or axis of rotation, at least one cutting insert carrier arranged radially adjustably on the main body and a central adjusting device for adjusting the position of the cutting insert carrier with respect to the main body. An example for such a cutting tool is a fine drilling tool for drilling out and reworking a bore which has already been produced, such as is shown and described, for example, in the initially discussed DE 4022579 A1. According to the model of the cutting tool specified in DE 4022579 A1, the cutting insert carrier can cooperate with the central adjusting device arranged in the main body via a wedge gear.

It should be noted that the above-mentioned cutting insert carrier is generally understood as a unit, a part, a body, a means or the like which—indirectly or directly—carries one or more cutting inserts for cutting a workpiece. A cutting insert carrier according to the invention can, for example, be configured in the manner of a rocker or a pivot beam as a two-armed lever held pivotably on the main body, for example, according to the model of the initially discussed DE 4022579 A1 or in the manner of the elastically deformable bending beam held on the main body, e.g. as a so-called clamp holder, in particular a short clamp holder and can carry a cutting tool, for example, a cutting insert, a cutting plate or the like with one or more cutting edges. Unlike such a cutting insert carrier which carries one or more cutting edges—indirectly—a cutting insert carrier according to the invention can however also be formed from a cutting tool constructed in one part or fabricated in one piece, for example, in the manner of a turning tool, a cutting insert, a cutting plate or the like and can carry one or more cutting edges for cutting a workpiece—directly.

Unlike the cutting tool specified in DE 4022579 A1, the adjusting device of a cutting tool according to the invention now comprises a threaded sleeve arranged non-rotatably but axially displaceably in the main body and a screw drive driving the threaded sleeve. According to the model of the cutting tool specified in DE 4022579 A1, the threaded sleeve can cooperate with the cutting insert carrier via a wedge gear.

In any case, thanks to the screw drive, the adjusting device of the cutting tool according to the invention allows a precise, finely metered position adjustment of the cutting insert carrier relative to the longitudinal central axis or axis of rotation. In the simplest case, the screw drive can comprise a threaded spindle screwed to the threaded sleeve which brings about an axial displacement of the threaded sleeve by means of a rotary actuation.

In a preferred embodiment, the threaded spindle can be actuated from the front side of the main body. The actuation can be accomplished manually or controlled by machine tool. For this purpose, an actuating element which is held rotatably but axially fixedly at the front end of the main body can be provided, which engages non-rotatably but axially movably with the threaded spindle.

The screw drive which displaces the threaded sleeve allows the cutting insert carrier to be adjusted by means of an axial displacement between a retracted position in which the cutting tool held on the cutting insert carrier lies at a minimal diameter and an extended position in which the cutting tool held on the cutting insert carrier lies at a maximum diameter. The screw drive therefore allows a precise fine adjustment of the cutting insert carrier independent of an adjustment between the retracted position and extended position.

Such an adjustment of the cutting insert carrier between a retracted position in which the cutting tool held on the cutting insert carrier lies at a minimal diameter and an extended position in which the cutting tool held on the cutting insert carrier lies at a maximum diameter can be achieved, for example whereby the screw drive is connected to a piston arranged in a pressure chamber in the main body. The piston can be supported elastically, preferably resiliently with respect to the main body.

In a preferred embodiment, the screw drive can comprise a threaded spindle screwed with the threaded sleeve. The threaded spindle can, for example, be connected to the afore-mentioned piston but this is not compulsory.

In order to achieve a particularly fine adjustment, the threaded spindle can be formed from a differential threaded spindle. In this case, the screw drive can further comprise a bearing bushing arranged between the threaded sleeve and the piston, which, for example, is connected to the afore-mentioned piston in a tension-proof/pressure-resistant manner and the differential threaded spindle can be screwed with a first threaded portion to the threaded sleeve and with a second threaded portion to the bearing bushing.

In order to reduce an unavoidable thread play between the screw drive and the threaded sleeve, a compression spring can advantageously be arranged between the threaded sleeve and the screw drive, with the result that a high diameter dimensional accuracy can be achieved.

In this sense, an alignment device assigned to the cutting insert carrier can furthermore be arranged between the cutting insert carrier and the threaded sleeve which enables an individual positional adjustment of the cutting insert carrier with respect to the main body. This alignment device can comprise a threaded bushing integrated in the cutting insert carrier having a radially elastically deformable wall segment, an adjusting screw screwed to the threaded bushing and supported on the threaded sleeve with its end projecting from the threaded bushing and a pressure element arranged on the cutting insert carrier which presses the wall segment against the adjusting screw. This alignment device is based on the idea that as a result of the application of pressure to the elastically resilient wall segment of the threaded bushing, a region of the internal thread of the threaded bushing corresponding to the wall segment is pressed in a direction transverse to the bushing axis towards the external thread of the adjusting screw screwed into the threaded bushing, with the result that the thread play between the region of the internal thread of the threaded bushing corresponding to the wall segment and the external thread of the adjusting screw can be reduced in both axial directions. In particular, due to the displacement of the region of the internal thread of the threaded bushing corresponding to the wall segment inwards towards the external thread of the adjusting screw, it is achieved that the thread flanks of the internal thread are pressed towards the opposite thread flanks of the external thread in both axial direction. An axial movement of the adjusting screw within the threaded bushing is thereby limited. Thanks to the reduced thread play, an axial movement of the adjusting screw relative to the threaded bushing and therefore a movement between the cutting tool and the main body of the cutting tool can be limited even when the cutting tools experience variable cutting forces during a cutting of a workpiece. A higher diameter dimensional stability can thus be achieved due to the alignment device according to the invention.

The elastically resilient wall segment can be formed by a slot which penetrates the threaded bushing wall, in particular a substantially U-shaped slot. In order to ensure an abutment against the adjusting screw which reliably reduces the thread play over an appropriate length, the wall segment can extend in the axial direction of the threaded bushing.

Furthermore, the threaded bushing can have a flange forming a stop at one end thereof for fixing on the main body, cutting tool, cutting insert carrier or the like. The position of the threaded bushing in the direction of the bushing axis can be fixed by means of the flange.

The pressure element pressing laterally against the wall segment can advantageously be formed from a tensioning screw screwed to the main body, cutting tool, cutting insert carrier or the like, which presses the wall segment against the tensioning screw. By means of a rotational actuation of the tensioning screw, it is possible to make an adjustable reduction of the thread play between the external thread of the tensioning screw and a region of the internal thread of the threaded bushing corresponding to the wall segment in such a manner that a screw actuation of the tensioning screw is only just possible but on the other hand, no further perturbing thread play is present. This further development therefore offers the possibility not only to reduce the thread play but to adjust or correct the thread play.

Notwithstanding the specific configuration and arrangement of the cutting insert carrier on the main body, the threaded bushing can be arranged in a through hole in the cutting insert carrier which permits actuating access to the tensioning screw from the side facing away from the main body, for example, radially from outside. The threaded bushing can be fixed in the cutting insert carrier in the axial and/or circumferential direction of the through hole in a firmly bonded manner, positively and/or non-positively.

A cutting tool according to the invention can have a plurality of cutting insert carriers which are arranged around the axis of rotation at predefined, preferably the same, angular distances and which are each supported on the threaded sleeve. A synchronous adjustment and/or setting of all the cutting insert carriers can be brought about via the central adjusting device. At the same time, each cutting insert carrier can be adjusted individually via an assigned adjusting device.

A preferred embodiment of a multi-cutting-edge cutting tool with an alignment device according to the invention will be described hereinafter with the aid of the appended drawings. In the figures.

PREFERRED EMBODIMENT

Figure 1:
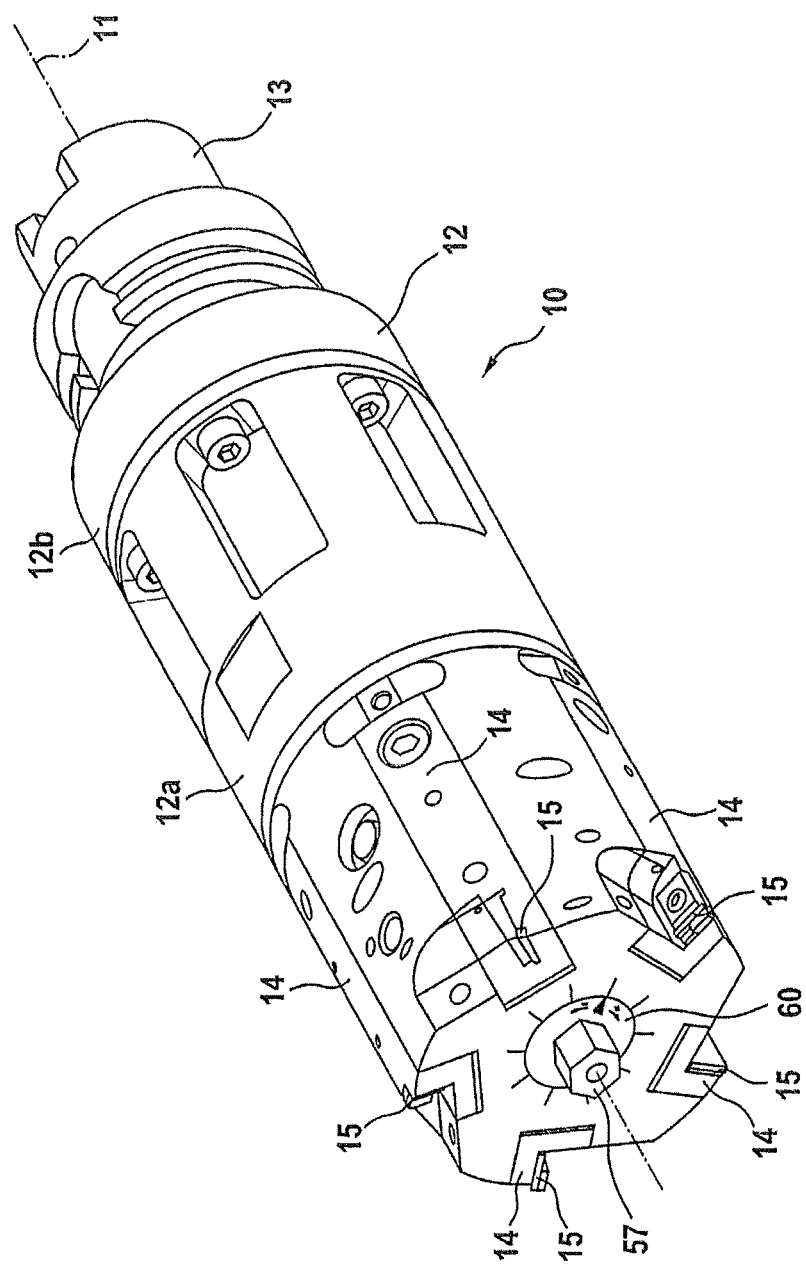
FIG. 1 shows a perspective side view of a multi-cutting-edge cutting tool with an alignment device according to the invention.

FIG. 1 shows in a perspective side view a multi-cutting-edge cutting tool 10 which, for example, is used for the machining of a cylinder bore of an internal combustion engine. The cutting tool 10 can therefore also be designated as a cylinder bore machining tool or generally as a bore reworking or bore fine machining tool.

The cutting tool 10 has a main body 12 extending along a longitudinal central axis or axis of rotation 11, which in the embodiment shown is composed in modular fashion of a front part and a rear part. As shown in FIG. 1, the front part 12a and the rear part 12b are screwed together. At its rear (in FIG. 1 right) end, the clamping tool 10 has a coupling shaft 13 to be connected, for example, to a machine tool spindle, which in the embodiment shown is formed from an HSK (hollow shaft cone) shaft. Alternatively to this however, a so-called SK (steep cone) shaft or the like can also be provided. The cutting tool 10 can be used in a stationary position or rotatably driven.

At the front end (left in FIG. 1) of the cutting tool 10, five cutting insert carriers 14 are arranged in the main body 12 in equidistant angular division. Each cutting insert carrier 14 carries a cutting tool 15, for example, a cutting insert, a cutting plate or the like and is adjustable radially inwards or outwards by means of a central adjusting device 16 which can be seen in FIG. 2 synchronously with the respectively other cutting insert carriers 14. Independently of this, each cutting insert carrier 14 is individually adjustable in position via an assigned alignment device 17 in the radial direction relative to the central adjusting device 16 or to the longitudinal central axis or axis of rotation 11 of the main body 12.

Cutting Insert Carrier 14

The cutting insert carriers 14 are all characterized by the same structure and the same operating mode so that hereinafter the structure and the operating mode of the cutting insert carriers 14 will be described in detail for the example of the cutting insert carrier 14 lying at the bottom, shown in FIG. 2.

Figure 4:
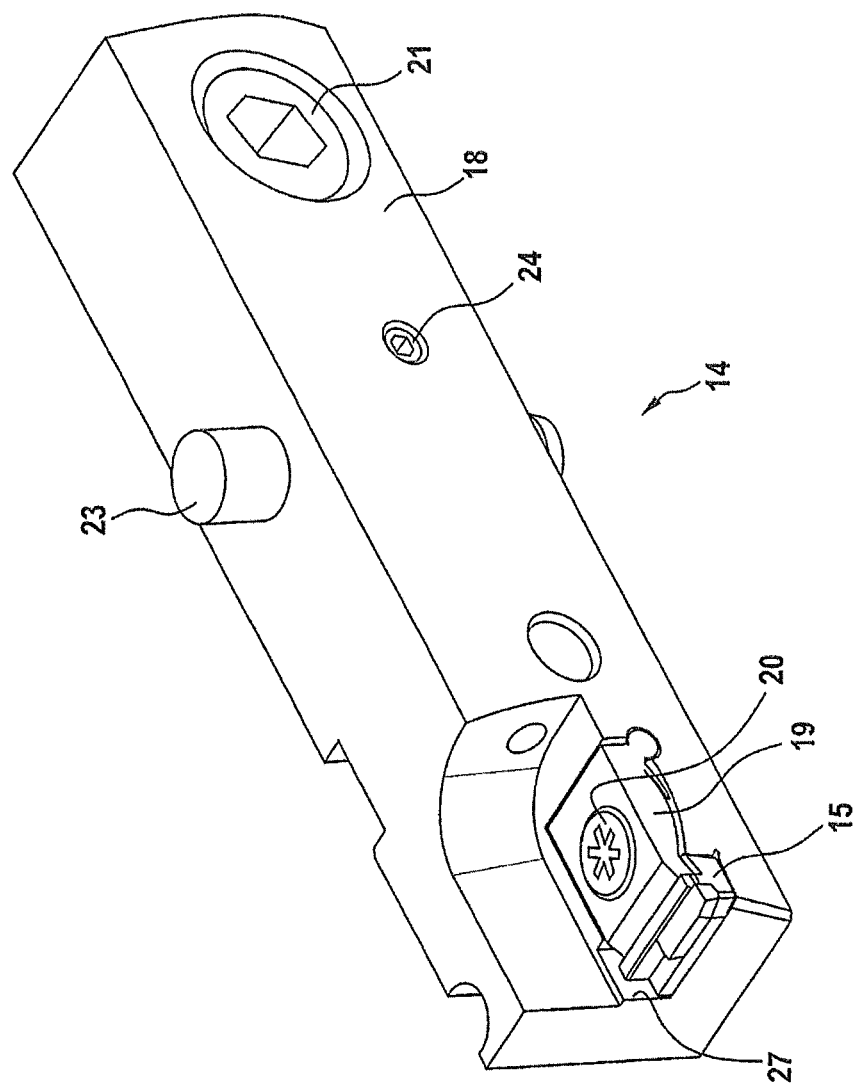
FIG. 4 shows a perspective side view of a cutting insert carrier carrying a cutting tool.

The cutting insert carrier 14 shown on a larger scale in FIG. 4 substantially comprises a support body 18, the cutting tool 15 held on the support body 18, a clamping claw 19 for firmly clamping the cutting tool 15, a clamping screw 20, the alignment device 17, a spring stop screw 21, a compression spring 22, a bearing pin 23 and a locking screw 24.

Figure 3:
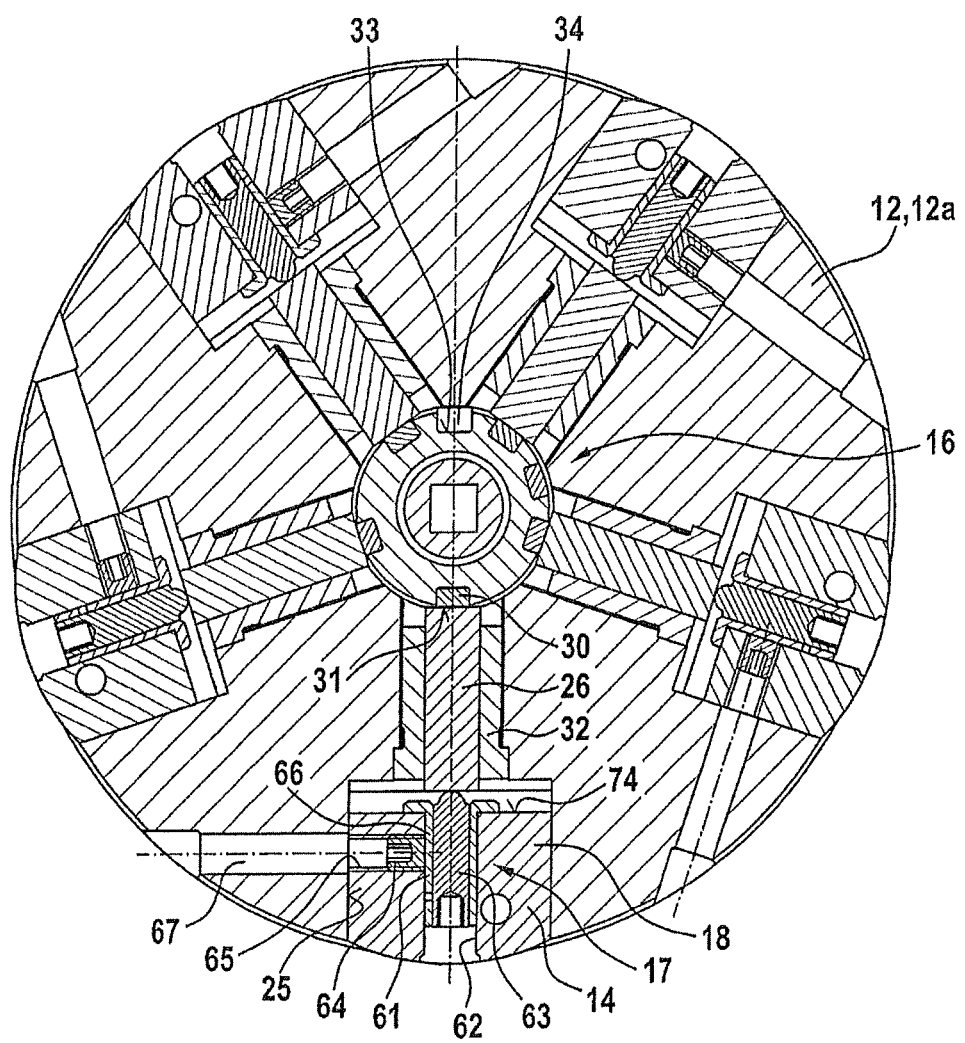
FIG. 3 shows a cross-sectional view of the cutting tool at the point characterized in FIG. 2 by a line III-III.

It can be seen in FIG. 3 that the support body 18 is fabricated from a prismatic or parallelepiped-shaped block which is received in a prismatic or parallelepiped-shaped receiving pocket 25 which is open on the front and external circumference side in the main body 12, and which extends in the direction of the longitudinal central axis or axis of rotation 11 of the main body 12, which receiving pocket is formed at a radial distance from the longitudinal central axis or axis of rotation 11. Relative to a longitudinal sectional plane containing the longitudinal central axis or axis of rotation 11 (cf. FIG. 3), the receiving pocket 25 is formed substantially symmetrically in cross-section.

The cutting insert carrier 14 is held pivotably in the receiving pocket 25 via a bearing pin 23 mounted on the main body 12. The bearing pin 23 passing through the support body 18 extends in a direction transverse to the longitudinal central axis or axis of rotation 11 and is arranged on both sides of the support body 18 in axial bores not designated in detail in the main body 12. The bearing pin 23 is fastened non-detachably to the support body 18 by the locking screw 24 screwed in the support body 18, which is accessible on the external circumference side. The cutting insert carrier 14 is therefore received in the receiving pocket 25 so that it can pivot about a pivot axis aligned transversely to the longitudinal central axis or axis of rotation 11.

The support body 18 thus forms a two-sided lever which is mounted pivotably in the manner of a rocker. As shown in FIG. 2, the alignment device 17 in FIG. 2 is arranged on the side of the left longer lever arm whereas the compression spring 22 and the spring stop screw 21 are arranged on the side of the right shorter lever arm. The spring stop screw 21 forms a stop for the compression spring 22 on the support body side. The compression spring 22 exerts a spring force on the cutting insert carrier 14 via the shorter lever arm in such a manner that the cutting insert carrier 14 in FIG. 2 is pivoted in the clockwise direction. FIG. 2 shows that the support body 18 is supported on the longer lever arm via the alignment device 17 and a pressure pin 26 arranged radially displaceably in the main body 12 on the central adjusting device 16.

The cutting tool 15 is, as shown in FIG. 4, received positively in a seat 27 which is incorporated in the support body 18 and which is accessible on the front and external circumference side and is clamped by actuation of the clamping screw 20 via the clamping claw 19 against the support body 18.

Adjusting Device 16

Figure 2:
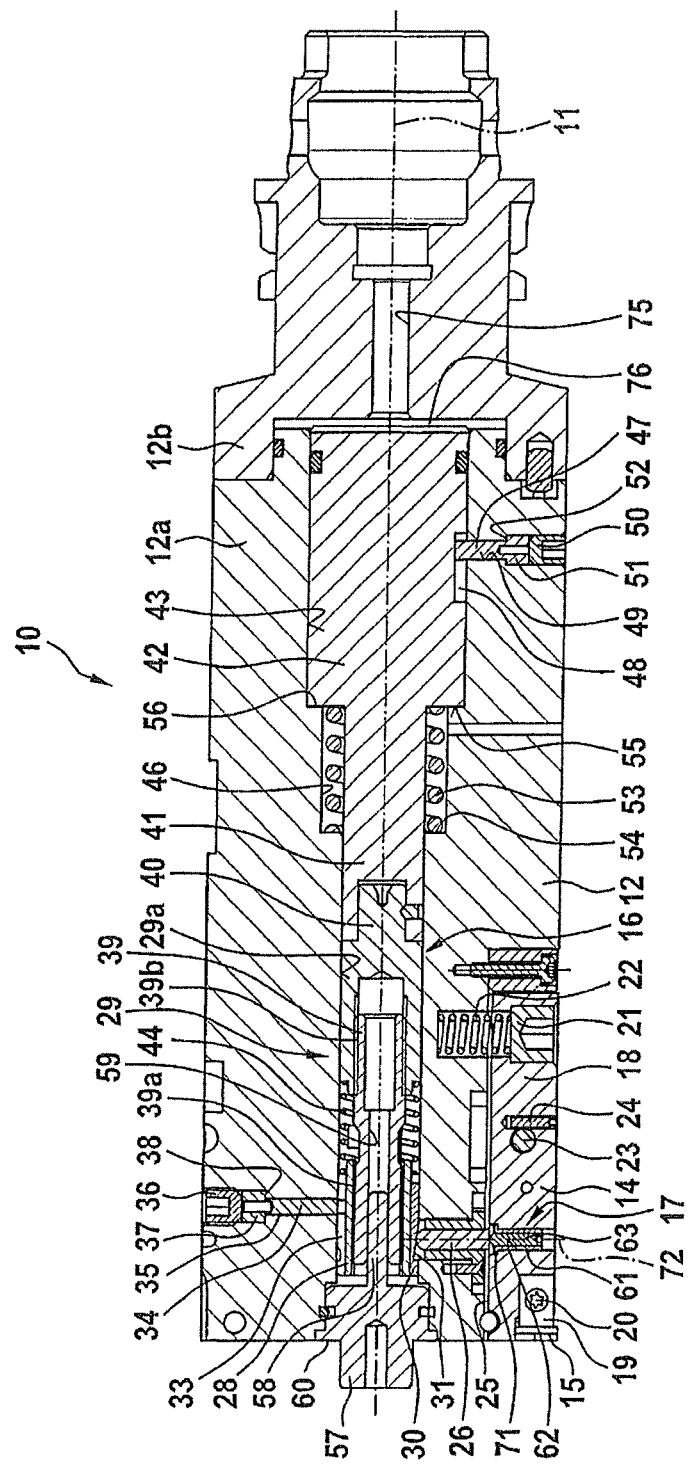
FIG. 2 shows a longitudinal sectional view of the cutting tool.

The central adjusting device 16, as shown in FIG. 2, has a threaded sleeve arranged in the main body 12 and a screw drive 29 which axially displaces the threaded sleeve 28.

The threaded sleeve 28 forms an adjusting means which brings about a radial adjustment of the cutting insert carrier 14. The threaded sleeve is arranged non-rotatably but axially adjustably in a central bore 29a in the main body 12 and cooperates with the cutting insert carriers 14 via a wedge drive. As shown in FIG. 3, the threaded sleeve 28 has on its outer circumference a number of support strips 30 corresponding to the number of cutting insert carriers 14. Each support strip 30 is assigned to one of the cutting insert carriers 14 and has on the outside a control surface 31 inclined with respect to the longitudinal central axis or axis of rotation 11 on which a pressure pin 26 cooperating with the cutting insert carrier 14 abuts. Each pressure pin 26 is arranged radially displaceably in a guide bushing 32 fixed in the main body 12. The control slope 31 with the end face of the pressure pin 26 forms the afore-mentioned wedge gear which converts an axial movement of the threaded sleeve 28 into a radial movement of the pressure pin 26. The non-rotatable arrangement of the threaded sleeve 28 in the central bore 29a in the main body 12 is achieved by a locking pin 34 engaging in an axial longitudinal slot 33 on the outer circumference of the threaded sleeve 28, which locking pin is held detachably in a radial stepped bore 35 in the main body 12. As shown in FIG. 2, the engagement of the locking pin 34 in the longitudinal slot 33 of the threaded sleeve 28 is secured by a locking screw 36. The locking pin 34 has a head 37 which is enlarged in diameter, which strikes radially inwards against a step 38 of the stepped bore 35. As a result of the fixing of the locking pin 34 in the radial direction thus achieved, it can be prevented that the locking pin 34 presses against the base of the longitudinal slot 33 and thereby impedes the axial displaceability of the threaded sleeve 28. Only the end of the locking pin 34 engaging in the longitudinal slot 33 can be seen in FIG. 3, which end is held at a radial distance from the base of the longitudinal slot 33.

The axial drive of the threaded sleeve 28 is accomplished via the screw drive 29. The screw drive 29, as shown in FIG. 2, substantially comprises a threaded spindle 39 and a bearing bushing 40 arranged at an axial distance to the threaded sleeve 28 in the central bore 29a in the main body 12. In the embodiment shown the threaded spindle 39 is formed from a differential threaded spindle which is screwed to an internal threaded bore of the threaded sleeve 28 via a first thread portion 39a and to an internal threaded bore of the bearing bushing 40 via a second thread portion 39b.

The bearing bushing 40 is arranged non-rotatably but axially displaceably similarly to the threaded sleeve 28 in the central bore 29a in the main body 12. The non-rotatable arrangement of the bearing bushing 40 is achieved by a non-rotatable connection to a piston extension 41 of a piston 42 described subsequently, which is arranged non-rotatably but axially displaceably in a piston bore 43 in the main body 12.

Located between the threaded sleeve 28 and the bearing bushing 40 is a compression spring 44 in order on the one hand to reduce any thread play between the external thread of the first thread portion 39a of the threaded spindle 39 and the internal thread of the threaded sleeve 28 and on the other hand, any thread play between the external thread of the second threaded portion 39b of the threaded spindle 39 and the internal thread of the bearing sleeve 40.

The screw drive 29 thus configured offers two independent possibilities for an axial displacement of the threaded sleeve 28:

1) Synchronous Retraction/Extension of the Cutting Insert Carriers 14

On the one hand, as a result of a displacement of the bearing bushing 40, the entire screw drive 29 together with the threaded sleeve 28 can be displaced without any twisting of the threaded spindle 39, i.e. without any relative movement between the threaded sleeve 28 and the bearing bushing 40. This adjustment possibility is used in order to adjust the cutting insert carriers 14 synchronously between a retracted position in which the cutting tools 15 held on the cutting insert carriers 14 lie at a minimal diameter and an extended position in which the cutting tools 15 held on the cutting insert carriers 14 lie at a maximum diameter.

For this purpose, the screw drive 29, in particular the bearing bushing 40, is connected to the already-mentioned piston 42 in a tension-proof/pressure-resistant manner. The piston 42 is arranged non-rotatably but axially displaceably in a piston bore 43 in the main body 12. It can be seen in FIG. 2 that the piston bore 43 is connected to the central bore 29a via a connecting bore 46. The piston 42 configured in a step-like manner has a piston extension 41 which passes through the connecting bore 46 and is connected to the bearing bushing 40 in the area of the central bore 29a in a non-rotatable as well as tension-proof/pressure-resistant manner. The non-rotatable arrangement of the piston 42 in the piston bore 43 is achieved by a locking pin 47, which engages in an axial longitudinal slot 48 on the outer circumference of the piston 42 and is held detachably in a radial stepped bore 49 in the main body 12. As shown in FIG. 2, the engagement of the locking pin 47 in the longitudinal slot 48 of the piston 42 is secured by a locking screw 50. The locking pin 47 has a head 51 which is enlarged in diameter, which strikes radially inwards against a step 52 of the stepped bore 49. Due to the fixing of the locking pin 47 in the radial direction, it can be prevented that the locking pin 47 presses against the base of the longitudinal slot 48 and thereby impedes the axial displaceability of the piston 42.

A compression spring 53 which urges the piston 42 to the right in FIG. 2 is tensioned between the piston 42 and the main body 12. On the main body side, the compression spring 53 is supported on a step 54 formed between the connecting bore 46 and the central bore 29a, on the piston side the compression spring 53 is supported on an annular surface 55 surrounding the piston extension 41 of the piston 42.

A step 56 formed between the connecting bore 46 and the piston bore 43 forms an axial stop for the piston 42. In the embodiment shown the piston 42 is driven to the left in FIG. 2 fluidically against the spring force of the compression spring 53. For this purpose the piston 42 is received in a sealed manner in the piston bore 43. Via a pressure channel 75 formed in the main body 12, a fluid pressure is fed into a pressure chamber 76 of the piston bore 43 delimited by the piston 42 with the result that the piston 42 is displaced to the left in FIG. 2 against the spring force of the compression spring 53. A displacement of the piston 42 brings about a uniformly directed displacement of the bearing bushing 40 and therefore of the screw drive 29 and the threaded sleeve 28.

The cutting insert carriers 14 supported on the control slopes 31 of the threaded sleeve 28 can thus be synchronously retracted and extended, i.e. adjusted radially inwards and outwards by a pressurization of the piston 42 accomplished on the machine tool side.

2) Synchronous Coarse or Pre-Setting of the Cutting Tools 15

On the other hand, as a result of a displacement of the threaded spindle 39, e.g. in the state shown in FIG. 2 in which the piston 42 abuts against the stop 56, the threaded sleeve 28 can be adjusted relative to the bearing bushing 40. As a result of the non-rotatable and tension-proof/pressure-resistant connection to the piston 42, during a twisting of the threaded spindle 39 neither the axial position nor the rotational position of the bearing bushing 40 change. As a result of a suitable design of the pitch difference between the first thread portion 39a and the second thread portion 39b of the threaded spindle 39, a precise displacement of the threaded sleeve 28 and therefore a precise adjustment of the cutting insert carriers 14 can be achieved. This adjustment possibility can be used for a synchronous coarse setting of the cutting tools 15 held in the cutting insert carriers 14 in the direction of a predefined nominal diameter.

For this purpose, the adjusting device 16 has an actuating element 57 held movably but axially fixedly at the front end of the main body 12, which is in engagement with the threaded spindle 39 non-rotatably but axially movably. In the embodiment shown, the actuating element 57 has an extension 58 which is quadrangular in cross-section, which engages positively in an engagement opening 59 of the threaded spindle 39 which is quadrangular in cross-section. The threaded spindle 39 is also twisted with the actuating element 57. As a result of the screwing to the threaded sleeve 28, this is displaced axially during a twisting of the threaded spindle 39. With a view to the, for example, manual actuation of the actuating element 57, the actuating element can have a scale ring 60, as can be seen in FIG. 1, which enables a twisting of the actuating element 57 and therefore of the threaded spindle 39 which can be checked.

The cutting insert carriers 14 supported on the control slopes of the threaded sleeve 28 can therefore be set synchronously to a predefined nominal diameter by a manual rotational actuation of the actuating element 57 or a rotational actuation accomplished on the machine tool side. This pre-setting can take place in the extended state of the cutting insert carriers 14 shown in FIG. 2 in which the cutting tools 15 lie at a maximum diameter. The pre-setting can however naturally also take place in a retracted state of the cutting insert carriers 14.

Alignment Device 17

Specifically for the machining of a cylinder bore of an internal combustion engine, however, it is crucial that all the cutting tools 15 lie exactly at a pre-defined nominal diameters of the cutting tool 10. In order to meet this requirement, the cutting tools 15 must all be re-adjusted with μm-precision to a pre-defined nominal diameter dimension. This is necessary, for example, when the cutting tool 10 is newly assembled or when cutting edge wear necessitates a re-adjustment of individual cutting tools 15.

For this purpose, the cutting insert carriers 14 are each designed to be adjustable in position with respect to the main body 12, in particular the central adjusting device 16 arranged in the main body 12. Each cutting insert carrier 14 is assigned an individually actuatable alignment device 17 by means of which the cutting insert carrier 14 and therefore the cutting tool 15 held on the cutting insert carrier 14 are radially adjustable relative to the main body 12, in particular the longitudinal central axis or axis of rotation 11.

The alignment device 17 integrated in the support body 18 on the side of the longer lever arm comprises a wall-segment-slotted threaded bushing 61, which is arranged non-rotatably and axially fixedly in a substantially radially running threaded bushing bore 62 in the support body 18 in a firmly bonded manner, non-positively and/or positively in relation to the bore axis of the threaded bushing bore 62, an adjusting screw 63 screwed into the threaded bushing 61 which cooperates with a corresponding control slope 31 of the threaded sleeve 28 via the already-mentioned pressure pin 26 and a tensioning screw 64 arranged laterally of the threaded bushing 61, which can be seen in FIG. 3, which is screwed into a threaded bore 65 in the support body 18 running transversely to the threaded bushing bore 62 and as a pressure element presses an elastically deformable wall segment 66 inwards towards the adjusting screw 63.

The threaded bore 65 receiving the tensioning screw 64 is accessible from the outer circumference of the main body 12 via a larger-diameter engagement bore 67 in the main body 12. The diameter of the engagement bore 67 in the main body can be so large that the tensioning screw 64 pressing against the wall segment 66 of the threaded bushing 61 can be actuated in any pivot position of the cutting insert carrier 14 by means of a tool key guided through the engagement bore 67, which engages in a key width of the tensioning screw 64. Alternatively to this however, the diameter of the engagement bore 67 can only be so large that a tool key guided through the engagement bore 67 can only be inserted into the key width of the tensioning screw 64 for a pre-defined pivot position range of the cutting insert carrier 14.

The threaded bushing bore 62 passes through the support body 18 in the radial direction, as shown in FIG. 2, so that the adjusting screw 63 is adjustable radially from outside by means of a suitable tool key which engages in a key width of the adjusting screw 63.

Figure 5:
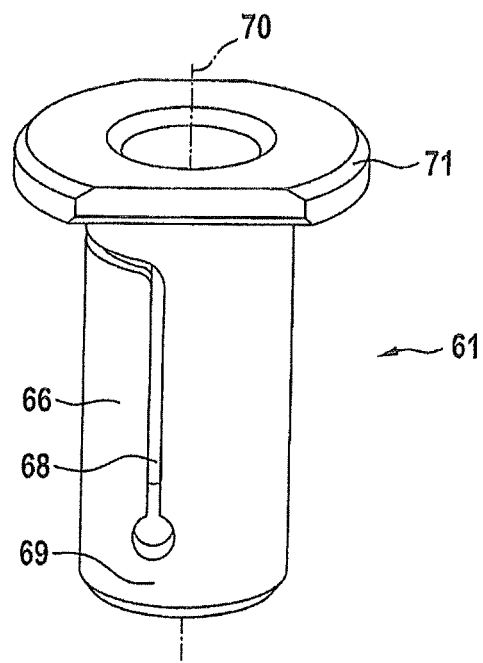
FIGS. 5 and 6 show various views of a wall-segment-slotted threaded bushing of the alignment device according to the invention.
Figure 6:
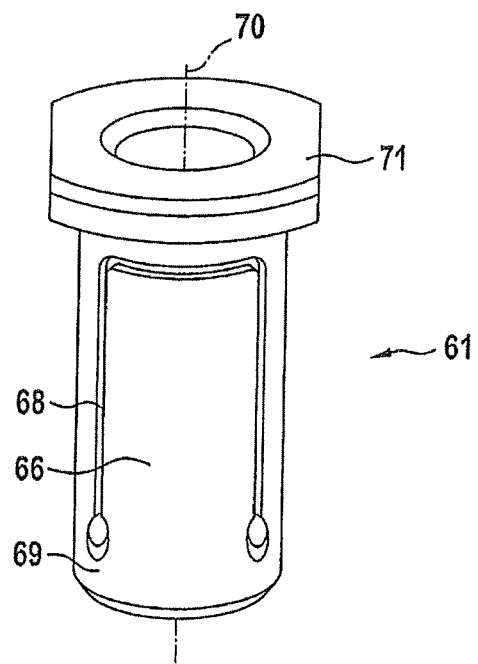

The threaded bushing 61 is shown in particular in FIG. 5. It is possible to identify the wall segment 66 which is formed by a U-shaped slot 68 passing through the threaded bushing wall. FIG. 5 shows that the wall segment 66 extends in the axial direction of the threaded bushing 61 and is connected to the threaded bushing wall at a portion 69 forming a material articulation in such a manner that it can be deformed elastically inwards in a direction transverse to the bushing axis 70.

At the end on the main body side, the threaded bushing 61 has a flange 71 which determines the position of the threaded bushing 61 in the direction of the bore axis 72 of the threaded bushing bore 62 in the support body 18 by abutting against a stop 74 on the support body side in the threaded bushing bore 62.

As a result of an application of pressure to the elastically resilient wall segment 66 of the threaded bushing 61 by means of a screw actuation of the tensioning screw 64, the region of the internal thread of the threaded bushing 61 corresponding to the wall segment 66 can be pressed against the external thread of the adjusting screw 63 screwed into the threaded bushing 61 in order to reduce the thread play between the internal thread and the external thread. As a result of the displacement of the region of the internal thread of the threaded bushing 61 corresponding to the wall segment 66 against the external thread of the adjusting screw 63, the thread flanks of the internal thread are pressed in both directions against the opposite thread flanks of the external thread. The thread play on both sides of each thread flank of the region of the internal thread of the threaded bushing 61 corresponding to the wall segment 66 is thus reduced. Thanks to the pressure element configured as tensioning screw 64, the thread play can not only be reduced but set or corrected to such an extent that a screw actuation of the adjusting screw 63 is still possible but an interfering thread play is eliminated.

FIG. 2 shows that the adjusting screw 63 is supported at its rounded end on the main body side on the already-mentioned pressure pin 26 and via the pressure pin 26 on the associated control slope 31 of the threaded sleeve 28 of the central adjusting device 16.

Via the alignment device 17 integrated in the cutting insert carrier 14, it is therefore possible to make a play-free fine adjustment of the cutting tool 15 relative to the longitudinal central axis or axis of rotation 11 of the cutting tool 10.

As a result of the integration of the alignment device 17 in the support body 18, a compactly constructed cutting insert carrier 14 is obtained which can be handled with the integrated alignment device 17 and the cutting tool 15 as an exchangeable component and can be mounted on the main body 12 of the cutting tool 10.

Further Embodiments

Naturally modifications of the previously described embodiment are possible without departing from the basic idea of the invention defined by the claims.

In the embodiment shown the adjusting device is integrated in the cutting insert carrier. This is particularly advantageous when a central adjusting device is provided. However, this need not be the case. If the cutting tool has no central adjusting device, the adjusting device can either be integrated in the cutting insert carrier or however in the main body. The only crucial factor is that the adjusting device is arranged functionally between the cutting tool and the main body.

Furthermore, the adjusting screw can cooperate indirectly with the main body or the cutting insert carrier, for example, as in the previously described embodiment, or however directly.

In the embodiment shown each cutting insert carrier carries precisely one cutting tool. The cutting insert carrier can carry at least one further cutting plate which, as seen in the axial direction of the cutting tool, is arranged for example at the height of the pivot axis of the cutting insert carrier. The position of the further cutting plate thus arranged would then be substantially uninfluenced by means of an adjustment or alignment carried out by means of the adjusting device and/or alignment device and can be provided, for example, to produce a bevel or the like.

The cutting tool can be formed from a cutting insert, a cutting plate or the like.

In the embodiment shown each cutting insert carrier is arranged pivotably in a rocker-like manner in a receiving pocket on the main body. In contrast, however, each cutting insert carrier can also be configured in the manner of an elastically deformable bending beam and screwed firmly in a receiving pocket on the main body of a cutting tool. In another modification each cutting insert carrier can be held radially displaceably in a receiving pocket on the main body of a cutting tool. The information used above (in the radial direction) "can be retracted/extended", "retracted/extended", "retract/extend" etc. should therefore be understood in the general sense that the cutting insert carrier or carriers are adjustable (in the radial direction), wherein the adjustment can be accomplished by pivoting (as in the embodiment shown), by elastic deformation or by rectilinear displacement of the respective cutting insert carrier.

In the embodiment shown, the pressurization of the piston is accomplished fluidically, in particular pneumatically or hydraulically. Alternatively to this, the pressurization of the piston can be initiated by electric motor or electromagnetically. The cutting tool can therefore have a hydraulically, pneumatically, electric-motor or electromagnetically operating adjusting drive which drives the piston.

In the embodiment shown, the cutting tool has an HSK (hollow shaft cone) shaft on the machine tool spindle side. Alternatively to this however, a so-called SK (steep cone) shaft or the like can be provided.

In the embodiment shown, the cutting tool is used for cylinder bore machining. However, the invention is not restricted to this application. A cutting tool according to the invention can be used for re-working or fine machining of a bore to a pre-defined nominal diameter.

Furthermore, in the embodiment shown, a plurality of cutting insert carriers are arranged on the main body of the cutting tool at the same height in the axial direction and at pre-defined angular spacings around the longitudinal central axis or axis of rotation of the main body. However, the arrangement of the cutting insert carriers at the same height in the axial direction is not compulsory. The cutting insert carriers can also be arranged axially offset, for example offset in a helical shape.

Furthermore, the cutting tool can have precisely one or a plurality of cutting insert carriers as in the embodiment described.

The control surfaces provided on the threaded sleeve can incorporated directly into the threaded sleeve material. That is, the support strips can be omitted. Furthermore, instead of individual control surfaces, the threaded sleeve can have a rotationally symmetrical cone surface on which the cutting insert carrier or carriers is or are supported indirectly or directly.

The invention claimed is:

1. Cutting tool comprising a main body which extends along a longitudinal central axis or axis of rotation, at least one cutting insert carrier arranged radially adjustably on the main body and an adjusting device for adjusting the position of the cutting insert carrier with respect to the main body, the adjusting device comprising a threaded sleeve arranged non-rotatably but axially adjustably in the main body and a screw drive driving the threaded sleeve, the screw drive comprising a threaded spindle and a bearing bushing, the bearing bushing is held non-rotatably in the main body, the screw drive is formed from a differential threaded spindle, the threaded spindle is screwed with a first threaded portion to the threaded sleeve and with a second threaded portion to the bearing bushing, and the bearing bushing is connected in an axially tension-proof/pressure-resistant manner to a piston which delimits a pressure chamber in the main body.

2. Cutting tool according to claim 1, wherein a compression spring is arranged between the threaded sleeve and the screw drive.

3. Cutting tool according to claim 1, wherein the screw drive can be displaced axially by a piston which delimits a pressure chamber in the main body.

4. Cutting tool according to claim 1, wherein the piston is supported elastically with respect to the main body.

5. Cutting tool according to claim 1, wherein the threaded spindle can be actuated on a front face of the main body.

6. Cutting tool according to claim 5, wherein the cutting tool further comprises an actuating element held rotationally movably but in an axially fixed manner on a front end of the main body, which actuating element engages with the threaded spindle non-rotatably but axially movably.

7. Cutting tool according to claim 1, wherein the threaded sleeve cooperates with the cutting insert carrier via a wedge gear.

8. Cutting tool according to claim 1, wherein the cutting tool further comprises an alignment device arranged between the cutting insert carrier and the threaded sleeve for radial positional adjustment of the cutting insert carrier with respect to the main body.

9. Cutting tool according to claim 8, wherein the alignment device comprises a threaded bushing integrated in the cutting insert carrier having a radially elastically deformable wall segment, an adjusting screw screwed to the threaded bushing and supported on the threaded sleeve with its end projecting from the threaded bushing and a pressure element arranged on the cutting insert carrier which presses the wall segment against the adjusting screw.

10. Cutting tool according to claim 1, wherein the cutting tool further comprises a plurality of cutting insert carriers which are arranged around the longitudinal central axis at predefined angular distances and which are each supported on the threaded sleeve.

11. Cutting tool according to claim 1, wherein the piston is supported resiliently with respect to the main body.

12. A cutting tool comprising:
a main body which extends along a longitudinal central axis or axis of rotation,
at least one cutting insert carrier arranged radially adjustably on the main body,
an adjusting device for adjusting the position of the cutting insert carrier with respect to the main body, and
an actuating element,
the adjusting device comprising a threaded sleeve arranged non-rotatably but axially adjustably in the main body and a screw drive driving the threaded sleeve, the screw drive comprising a threaded spindle screwed with the threaded sleeve, the threaded spindle can be actuated on a front face of the main body, the actuating element held rotationally movably but in an axially fixed manner on a front end of the main body.

13. A cutting tool comprising:

a main body which extends along a longitudinal central axis or axis of rotation, at least one cutting insert carrier arranged radially adjustably on the main body, an adjusting device for adjusting the position of the cutting insert carrier with respect to the main body, and an alignment device, the adjusting device comprising a threaded sleeve arranged non-rotatably but axially adjustably in the main body and a screw drive driving the threaded sleeve, the alignment device arranged between the cutting insert carrier and the threaded sleeve for radial positional adjustment of the cutting insert carrier with respect to the main body, the alignment device comprising a threaded bushing, an adjusting screw and a pressure element, the threaded bushing integrated in the cutting insert carrier, the threaded bushing having a radially elastically deformable wall segment, the adjusting screw screwed to the threaded bushing and supported on the threaded sleeve with its end projecting from the threaded bushing, the pressure element arranged on the cutting insert carrier, the pressure element configured to be screwed in the threaded bushing to press the radially elastically deformable wall segment against the adjusting screw.

14. Cutting tool according to claim 13, wherein the wall segment is formed by a slot which penetrates the threaded bushing wall.

15. A cutting tool comprising:

a main body which extends along a longitudinal central axis or axis of rotation, at least one cutting insert carrier arranged radially adjustably on the main body, an adjusting device for adjusting the position of the cutting insert carrier with respect to the main body, and a compression spring, the adjusting device comprising a threaded sleeve arranged non-rotatably but axially adjustably in the main body and a screw drive driving the threaded sleeve, the screw drive capable of being displaced axially by a piston which delimits a pressure chamber in the main body, the compression spring between the threaded sleeve and the screw drive, the threaded sleeve and the screw drive are threaded with respect to each other at regions of threaded sleeve and screw drive that are coaxial relative to the longitudinal central axis.

16. Cutting tool according to claim 15, wherein the screw drive comprises a threaded spindle screwed with the threaded sleeve.

17. Cutting tool according to claim 16, wherein the threaded spindle is formed from a differential threaded spindle, the screw drive further comprises a bearing bushing held non-rotatably in the main body and the differential threaded spindle is screwed with a first threaded portion to the threaded sleeve and with a second threaded portion to the bearing bushing.

18. Cutting tool according to claim 17, wherein the bearing bushing is connected in an axially tension-proof/pressure-resistant manner to a piston which delimits a pressure chamber in the main body.

19. A cutting tool according to claim 15, wherein the piston is supported elastically with respect to the main body.

20. A cutting tool according to claim 15, wherein:

the screw drive comprises a threaded spindle screwed with the threaded sleeve the cutting tool further comprises an actuating element held rotationally movably but in an axially fixed manner on a front end of the main body, which actuating element engages with the threaded spindle.

* * * * *